United States Patent [19]

Banks

[11] Patent Number: 5,913,198
[45] Date of Patent: Jun. 15, 1999

[54] SYSTEM AND METHOD FOR DESIGNING AND ADMINISTERING SURVIVOR BENEFIT PLANS

[75] Inventor: David P. Banks, Boca Raton, Fla.

[73] Assignee: SBP Services, Inc., Deerfield Beach, Fla.

[21] Appl. No.: 08/926,419

[22] Filed: Sep. 9, 1997

[51] Int. Cl.[6] .......................... G06F 15/30; G06F 17/00
[52] U.S. Cl. .................... 705/4; 705/35; 705/36
[58] Field of Search .................. 705/4, 14, 35, 705/36

[56] References Cited

U.S. PATENT DOCUMENTS

| | | | |
|---|---|---|---|
| 4,346,442 | 8/1982 | Musmanno | 705/36 |
| 4,376,978 | 3/1983 | Musmanno | 705/36 |
| 4,642,768 | 2/1987 | Roberts | 705/4 |
| 4,722,055 | 1/1988 | Roberts | 705/36 |
| 4,750,121 | 6/1988 | Halley et al. | 705/35 |
| 4,766,539 | 8/1988 | Fox | 705/4 |
| 4,831,526 | 5/1989 | Luchs et al. | 705/4 |
| 4,837,693 | 6/1989 | Schutz | 705/4 |
| 4,839,804 | 6/1989 | Roberts et al. | 705/36 |
| 4,975,840 | 12/1990 | De Tore et al. | 705/4 |
| 5,136,502 | 8/1992 | Van Remortel et al. | 705/2 |
| 5,429,506 | 7/1995 | Brophy et al. | 434/107 |
| 5,754,980 | 5/1998 | Anderson et al. | 705/14 |
| 5,812,987 | 9/1998 | Luskin et al. | 705/36 |

*Primary Examiner*—Allen R. MacDonald
*Assistant Examiner*—Penny Caudle
*Attorney, Agent, or Firm*—Jones, Day, Reavis & Pogue

[57] ABSTRACT

A computer-implemented system and method for designing and administering self-funded survivor benefit plans is disclosed. The system includes a specific purpose computer programmed with several computer software modules that enable the system to carry out the method disclosed. The system also includes at least one investment vehicle, such as a trust fund, that holds the employer/employee contributions to the plan, manages the investments of the plan and may also purchase and manage insurance contracts on certain high-risk and other employees to limit the liability and tax exposure of the plan. The computer software modules include a data import module for importing employer/employee data into a database that is also part of the system, a benefit plan design and costing module for modeling and optimizing the survivor benefit plan, an enrollment and administration module to manage the ongoing operation of the plan, and several other ancillary modules.

44 Claims, 3 Drawing Sheets

Figure 1 - SBP System

SYSTEM AND METHOD FOR DESIGNING AND ADMINISTERING SURVIVOR BENEFIT PLANS

BACKGROUND OF THE INVENTION

The present invention is directed toward the field of computer-implemented employee benefit plans. In particular, a system and method for designing and administering a self-funded survivor benefit plan is disclosed. This system and method are implemented in a specific-purpose computer system operating software ("the survivor benefit plan software") that carries out the functions disclosed in this application. Along with the specific-purpose computer system operating the survivor benefit plan software, the system includes an investment vehicle, such as a trust fund, which is used to maintain sufficient assets in order to meet the liabilities of the survivor benefit plan on an ongoing basis. The novel computer system and software are used to design and implement an employer-specific survivor benefit plan, and then to manage the ongoing administration of the plan, thereby removing this administrative burden from the employer.

A survivor benefit plan is an employee benefit, sponsored by the employer, which provides the employee's designated survivor(s), such as a spouse, children, etc., with a predetermined periodic income stream in the event that the employee dies while a participant in the plan. This type of plan is very attractive to employees because it provides a certain income stream to the designated beneficiaries without the investment problems attendant with a lump-sum payout, thereby ensuring a stable income to the beneficiaries over a period of time.

Individual employees have always been able to provide their own survivor benefit plans. However, there are several disadvantages to this type of single-employee plan as compared to an employer-sponsored group plan. The individual plan is much more costly than the employer-sponsored group plan, due primarily to setup and insurance costs, as well as fees to trustees and other individuals involved in managing the plan. It is simply not feasible, from a cost standpoint, for all but the higher compensated individuals to setup and operate their own survivor benefit plans. Therefore, a group plan, sponsored by the employer, is the most likely vehicle for employees to obtain survivor benefits for their designated beneficiaries.

Prior art survivor benefit plans typically consisted of insurance-based plans. In these types of prior art plans, the employer contacted an insurance company in order to provide the survivor benefit. The insurance company was provided some information on the employee demographics and salary levels, and then presented the employer with a static set of plan choices. The insurance company calculated the estimated liabilities created by the plan and then computed a premium value to be paid by the employer or employees, which also provided for the insurance companies profit for taking on the risk associated with the plan.

This type of prior art insurance-based plan has many disadvantages: (1) it is inflexible, in that the employer is typically provided with a static set of benefit choices for the plan and cannot easily custom-design its own plan; (2) it is more costly than a self-funded plan, as disclosed in the present application, because of the margins necessary to compensate for the uncertainty associated with the risk underwritten by the insurance company, and because of the insurance company's profit; (3) the insurance company plans typically do not provide integration of benefits, in which the survivor income benefit generated by the plan is offset by other employer-selected benefits; (4) the employer must maintain detailed records and data on each employee's benefit level, designated beneficiaries, etc; (5) any gains on investments made using the insurance premiums paid by the employer or employees inure to the insurance company, not to the plan; and (6) the insurance plan usually bears a much greater tax burden compared to a self-funded plan. These are just some of the numerous problems that exist in the prior art.

Therefore, there remains a need in this art for a computer-implemented system and method for designing employer-specific survivor benefit plans.

There remains a more particular need for such a system and method that manages the ongoing administration of the plan, so that the employer need not deploy scarce human resources to the plan's management.

There remains an additional need for a self-funded survivor benefits system that includes a computer system, specific software modules for operating the computer system, and an investment vehicle for holding the assets of the survivor benefit plan on behalf of the employee-designated survivor(s).

There remains another need in this art for such a system that identifies certain high-earning employees as high-risk to the plan and determines the amount of insurance for the plan to purchase in order to mitigate the effect of one such high-earing employee dying and thereby creating a large liability for the plan. An employee is "high-risk" when the calculated survivor income benefit and resulting plan liability exceed a predetermined risk tolerance provided by the employer. High-risk employees create large liabilities for the plan if they die, and therefore it is usually desirable to protect the plan from such liabilities.

There remains a more particular need for such a system that is more cost effective than the prior art insurance-based plans, and which provides a level of customization and flexibility in the design of the specific employer's plan that is unknown in the prior art.

There remains yet another need in this art for a computer system that is capable of designing and managing self-funded employer-sponsored survivor benefit plans that enable flexible funding and that are cost effective. Such a system should be able to design a specific employer plan based on the employer's specific parameters as to how the plan should operate, the employer's other benefits to be integrated, and on data specific to each employee covered by the plan. In designing the plan, it would be desirable for the system to be able to create a financial model of the plan, taking into account the employer parameters, desired benefit integration, predetermined funding level and employee data. The financial model should be created by performing detailed calculations to arrive at a contribution level for the employer and/or employees that meet or exceed the predetermined funding level specified by the employer as applied to the expected liabilities in a particular year.

There remains an additional need for such a computer system that is capable of periodically remodeling the entire benefits plan and recalculating specific contribution levels in order to ensure that the plan is properly funded on an ongoing basis.

There remains yet another need for such a computer system that is capable of providing numerous detailed reports on the status of the plan for use by the employer, taxing authorities and/or other individuals associated with the survivor benefit plan.

Finally, there remains an additional need for such a computer system that, over time, can accumulate mortality statistics on a particular employer, and can then remodel the survivor benefit plan in order to account for the employer-specific mortality data, thereby providing a more accurate estimate of the costs and liabilities of the plan.

SUMMARY OF THE INVENTION

The present invention overcomes the problems noted above and satisfies the needs in this field for a computer-implemented system and method for designing and managing self-funded survivor benefit plans. The system includes a computer system, a survivor benefit software program, comprising several software modules, and an investment vehicle, such as a trust fund. Users of the system include the employer who is sponsoring the plan, the employees who are enrolled in the plan, the employee-designated beneficiaries who benefit from the proceeds of the plan, a plan trustee who administers the operation of the investment vehicle, a plan actuary who annually assesses the financial status of the plan, and system operators that design, implement and manage the ongoing administration of the plan using the specific-purpose computer operating the survivor benefits software program detailed below.

The survivor benefit software program includes a data import module (the "DIM"), a survivor benefit program database (the "SBP Database"), a benefit plan design and costing module (the "BPDCM"), an enrollment and administration module (the "EAM"), a word-processing module (the "WPM"), and a monthly payment module (the "MPM".) Together, these modules enable the functionality of the present invention. The detailed functionality of each module is described more fully below. In general terms, however, the DIM is used to collect certain employer and employee data and to convert the data into a particular format that is compatible with the SBP Database, and to store that certain information into records in the database. The SBP Database is used to store all of the employer and employee specific information that is used by the other modules to design, implement and manage the survivor benefit plan. The BPDCM is used to design, model, calculate and generate the specific employer survivor benefit plan. The EAM is used to implement the plan and manage the ongoing administration thereof. The WPM is used to generate enrollment forms and other printed materials for use in plan implementation. And the MPM is used to provide periodic payments to designated beneficiaries when an employee death occurs.

Because the present invention is self-funded, instead of insurance-based, the long-term costs associated with a survivor benefit plan created by the invention are generally much lower than the prior art insurance-based plans. In addition, the functionality of the BPDCM enables the employer to design a flexible plan that precisely matches the desires of the employer, and which can be altered as needed if the employer's desires for the plan change. This level of flexibility is not generally available with the prior art insurance-based plans.

The system of the present invention includes: a database for storing employer and employee data relevant to the design of the survivor benefit plan; a benefit plan design and costing module for generating a model of the survivor benefit plan using the employer and employee data in the database, the model including calculations of survivor income benefit levels for each employee-designated beneficiary, and of required contribution levels on the part of the employer and/or employees in order to fully fund the expected plan liabilities to a predetermined level; an enrollment and administration module for implementing the plan and for administering the contribution levels required by the employer and/or employees and the periodic payout of survivor income benefits from the plan; and an investment vehicle for holding, investing, and accounting for the employer and/or employee contributions and for disbursing the periodic survivor income benefit payments to the employee-designated beneficiaries. The benefit plan design and costing module is also for generating numerous plan reports for use by the employer, the employees, the manager of the investment vehicle, the plan actuary, and others. In addition, the benefit plan design and costing module is for determining whether certain employees covered by the plan are "high risks" and if so, for generating insurance data for integration into plan reports for use by the manager of the investment vehicle in order to purchase and manage insurance on the high-risk individuals, thereby mitigating the risk to the plan.

The enrollment and administration module implements the plan by downloading certain calculations from the benefit plan design and costing module and also downloading data from the database in order to generate enrollment forms to be completed by the employees. The completed enrollment forms are then entered into the database using a computer-implemented data import module. The enrollment and administration module also implements the plan by notifying the employer's payroll department of the required employer and/or employee contributions so that these sums can be withheld from the employee's paycheck and transferred, electronically, to the investment vehicle. This module then receives notification of a covered employee's death from the employer, calculates the survivor income benefit to be paid and the payment period for this particular employee-designated survivor, and transfers this information to a computer-implemented monthly payment module that provides the payments to the designated survivor(s).

The system of the present invention also may include a mortality database. The mortality database stores specific mortality data on the employer's employees, and is used by the benefit plan design and costing module to design a more accurate model of the survivor benefit plan. The system also includes a means for recalculating or remodeling the entire survivor benefit plan on a periodic basis, in order to provide an ongoing accurate forecast of the expected survivor income benefit liabilities to be paid and the corresponding employer/employee contributions that are required to fund the plan to the predetermined level.

One method of the present invention includes the steps of (a) providing a computer system for executing the method, the computer system having a database; (b) storing employee and survivor information in the database and calculating a survivor income benefit and a payment period; (c) calculating the present value ("PV") of the amount in step (b); (d) identifying all other employer provided benefits and calculating the PV of these benefits; (e) calculating the difference between (d) and (c) to arrive at a net survivor income benefit to be provided; (f) determining the PV of certain investment assets of the plan that yield a particular cash-flow; (g) providing data from the system so that sufficient investment assets can be purchased to meet the projected benefits required by the plan and determining employer/employee contribution levels to acquire the assets; and (h) making periodic payments to the survivors when a particular employee dies. Steps (a)–(g) generally correspond to the process carried out by the BPDCM. Step (h) is carried out by the EAM in concert with the MPM. The method also includes the steps of: (i) redetermining (or redesigning) on a periodic basis the various plan parameters, benefit levels, contributions, etc. and (j) continuing the period payments to the survivors.

Another method according to the present invention includes the computer-implemented steps of: (1) importing employer and employee data into a database; (2) designing a survivor benefit plan using this data, wherein the design includes calculations of: survivor income benefit levels for each employee's designated survivor(s), the expected annual liabilities of the plan, and the required contribution levels to fund the expected annual liabilities to a predetermined level; (3) implementing the plan by providing enrollment letters to the employees and receiving and importing the completed forms; (4) notifying the employer of the contribution levels for the covered employees; (5) transferring contributions to a trust fund; and (6) receiving a death notification from the employer and providing a periodic payment stream to the employee's designated survivor(s) based on the designed survivor income benefit level calculated in the designing step.

The present invention provides many advantages over the prior art. Foremost, it provides a computer-implemented system for designing and administering self-funded survivor benefit plans so that employers can provide a survivor benefit to their employees without having to purchase programs from insurance companies that do not provide flexible plan designs to the employer.

Additional advantages of the present invention include: (1) the ability to integrate the survivor income benefit provided by the plan with other employer-related benefits; (2) the ability to actuarially model the survivor benefit plan based upon employer-specific plan parameters and employee-specific data, thereby designing an optimal plan design to meet the employer's specific objectives and at the same time ensuring that the plan is funded as intended; (3) generation of numerous plan reports based on the database of employer and employee data, and on the modeling of the survivor benefit plan, in order to provide the employer, employees, plan actuary, investment manager, etc., with valuable information regarding the financial status of the plan; (4) providing an investment vehicle, such as a trust find, to hold the employer/employee contributions to the plan, the trust being able to invest the contributions in a variety of investments, so that the gains of the employer/employee contributions inure to the survivor benefit plan; (5) the optional provision of identifying particular employees as high-risk to the plan, if the particular employee were to die, and purchasing insurance for those high-risk employees in order to protect the survivor benefit plan from a large liability; (6) collecting data over time on the mortality history of the employer and forming an employer-specific mortality database, so that the modeling software of the present invention can remodel the plan design so as to account for the actual mortality history of the specific employer; (7) the ability to periodically recalculate and redesign the survivor benefit plan to account for changes in the employer parameters, the employee-specific data, the actual employer mortality data, etc., and (8) automating the process of implementing and administering the survivor benefit plan so that the employer need not be burdened with these functions.

These are just some of the many advantages provided by the present invention, described illustratively in more detail below. As will be appreciated, the invention is capable of other and different embodiments, and its several details are capable of modification in various respects, all without departing from the spirit of the invention. Accordingly, the drawings and description of the preferred embodiment are to be regarded as illustrative in nature and not restrictive.

BRIEF DESCRIPTION OF THE DRAWINGS

The present invention satisfies the needs remaining in this art and provides the advantages noted above, as well as many other advantages, as will become apparent from the following description when read in conjunction with the accompanying drawings wherein.

DETAILED DESCRIPTION OF THE DRAWINGS

Figure 1:
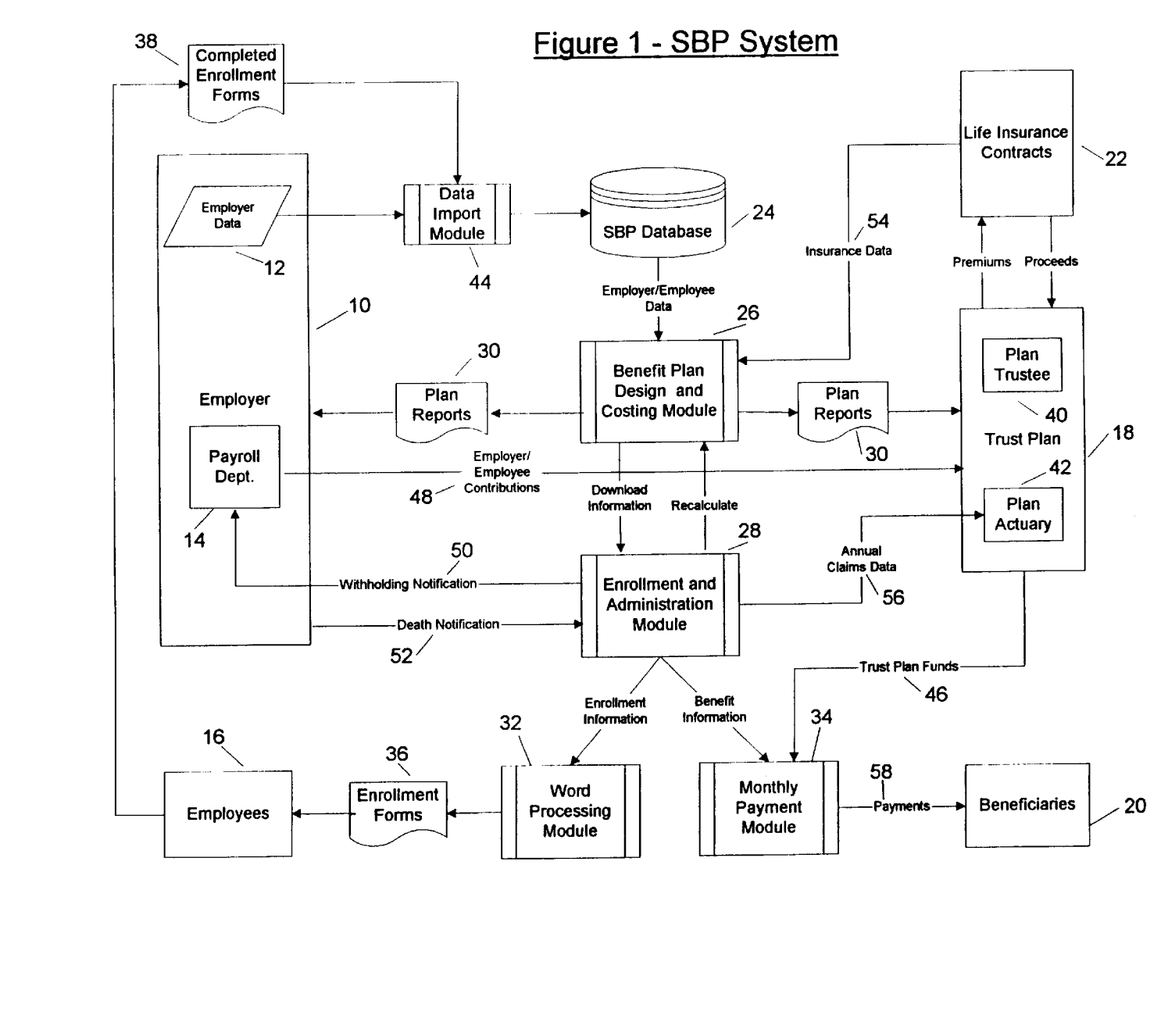
FIG. 1 is a block diagram of a preferred embodiment of the Survivor Benefit Program System ("SBP System") of the present invention.

Referring now to the drawings, FIG. 1 sets forth a block diagram of a preferred embodiment of the system of the present invention. The system of FIG. 1 includes an employer 10 who is desirous of setting up a self-funded survivor benefit plan, the employer having a payroll department 14, numerous employees 16, and a set of employer data 12, which is used in conjunction with the survivor benefit program ("SBP") to design and implement the survivor benefit plan of the employer. Along with the employer 10 and employees 16, FIG. 1 includes several other entities that may be part of the system, including the beneficiaries or designated survivor(s) 20, a trust fund 18, the trust fund having a plan trustee 40 and a plan actuary 42. Also set forth on FIG. 1 are optional life insurance contracts 22, which may be purchased by the plan to cover certain high-risk employees, and/or mitigate certain tax consequences as described in more detail below.

The functionality of the present invention is embodied in several software components operating on a computer platform. For those claims appended to the end of this application that include means-plus-function elements, the structure disclosed in support of these elements is the several software components described in more detail below. These components include the data import module (or DIM) 44, the Survivor Benefits Program Database (or SBP Database) 24, the Benefit Plan Design and Costing Module (or BPDCM) 26, the Enrollment and Administration Module (or EAM) 28, the Word Processing Module (or WPM) 32, and the Monthly Payment Module (or MPM) 34. These software components, or modules, are preferably written in the COBOL programming language for operation on a DOS-based computer system. Alternatively, however, these components could be written in other programming languages, such as C, C++, PASCAL, FORTRAN, VISUAL BASIC, PARADOX, or any other language that is capable of providing the functionality described for each component. Each of the software modules shown in FIG. 1 could be a single computer program, or could be several distinct programs that provide the functionality for the module. In addition, although the preferred embodiment for these components is a DOS-based interface, the software could operate on a Windows, UNIX, MAC OS, or any other type of computer operating system.

The preferred computer system for operating the various software components listed above is an IBM-compatible personal computer system, with an Intel-type microprocessor, 16 MB of RAM, a 500 MB hard disk drive to store system data, a display monitor, and a printer to generate the plan reports 30. Alternatively, other computer systems could be used with the present invention. For large employers, the most important aspect of the computer system is disk space. Typically a record for a single employee in the SBP Database requires about 12 KB of disk space. Thus, for a large employer the hard disk drive of the computer system should be quite large (i.e., 1 GB or higher) so as to store all of the employer and employee information that is necessary to design and administer the survivor benefit plan. Although not explicitly shown in FIG. 1, the computer system of the present invention operates the software modules noted above, and stores the SBP Database 24.

The system of FIG. 1 operates as follows. The first step in designing the survivor benefit plan for a specific employer 10 is to import the employer's data and the corresponding employee data into the SBP Database 24 of the present system. This data is typically provided by the employer on electronic media, such as floppy disk or optical disk, but could, alternatively be electronically transmitted from the employer 10 to the DIM 44 of the SBP system via modem or other communication device.

The employer/employee data 12 is imported into the SBP system using the DIM 44. The DIM 44 takes this data and converts it into ASCII records of a common format for use by the other modules of the SBP system. The employee data typically includes the following information: employee name, address, gender, date of birth, date of hire, marital status, social security number, base compensation, annual bonus percentage, commissions, spouse's date of birth (if applicable), and employee elections under other employer benefit plans. Other information could also be included in the employee data. The employer data typically includes the following information: copies of the employer's other benefit plans, assumptions regarding salary increase scales, discount rates, mortality rates, annuity rates, marginal income tax rates, pension plan factors, expected investment yields (from monies contributed and held in the trust fund), and specific data regarding employer parameters for designing the survivor benefit plan. Other information could also be included in the employer data.

These specific employer parameters are used to custom-design the plan, a feature that is not generally available with the prior art insurance-based plans, and include data such as classes of employees eligible to participate, income replacement percentages, other employer provided benefits to be used as offsets to the survivor income benefit, minimum benefit payment periods, disability provisions, predetermined funding level and risk tolerance. The "risk tolerance" is a measure of the level of risk that the employer or plan is willing to accept for particular "high-risk" employees that, because of their income level, have a large survivor income benefit and resulting benefit plan liability if they die. The risk tolerance measure is used to optionally purchase insurance products to protect the survivor benefit plan from large liabilities created when a high-risk employee dies.

The SBP Database 24 can also be used to store an employer-specific mortality database. Initially, if the employee population is not of sufficient size, or no mortality data is available on the employer's employee population, generic mortality tables must be used by the SBP system in order to estimate the mortality of the employee population being covered. But, over time, the SBP system collects specific data on the employer when a death notification 52 event occurs. By storing this data in the SBP Database 24, the SBP system can develop an employer-specific mortality table that can be used to remodel the survivor benefit plan on a periodic basis and thereby better estimate the periodic liabilities of the plan.

Once the initial employer/employee data 12 is imported into the SBP Database 24, a model of the specific employer plan is designed using the Benefit Plan Design and Costing Module (or BPDCM) 26. As described in more detail below in FIG. 2, the BPDCM 26 is a software module that is used to design a custom survivor benefit plan for the employer that is self-insured and funded to a predetermined level as specified by the employer. The predetermined funding level is preferably 100%, such that the plan is "fully funded", but could, alternatively, be any other level as specified by the employer, either less than 100% or greater. The BPDCM 24 takes the employer/employee data 12 from the SBP Database 24 and calculates a specific survivor income benefit per employee and converts this calculation to a present value. Optionally, the BPDCM calculates the present values of other employer-selected benefits (such as pension survivor benefits, 401 K, stock options, social security, etc.) to be used as an offset to the survivor income benefit and integrates these offsets. Having arrived at a net-present value of the survivor income benefit for each employee, the BPDCM 26 then uses several assumptions concerning rates of return, mortality rates, etc., in order to arrive at a contribution level for the employer and/or employees in order to fund the plans expected liabilities to the predetermined funding level. This calculation usually takes several iterations in order to arrive at a contribution level that just exceeds the expected liabilities multiplied by the predetermined funding level for the plan on an annual (or other periodic) basis.

Once a model of the survivor benefit plan has been generated, the BPDCM 26 creates numerous plan reports 30. These plan reports 30 illustrate annual SBP contribution levels and benefits for each employee, and composite costs for the employer 10 and the plan 18. The reports 30 also illustrate the names, ages, gender and present value amounts for each employee whose survivor income benefit present value exceeds the employer's risk tolerance. These reports 30 are used by the employer 10 and the BPDCM 26 to determine whether insurance should be purchased for the high-risk employees to protect the plan from large liabilities. If it is decided that certain high-risk employees should be covered by insurance, then the BPDCM 26 calculates minimum and maximum annual premium costs for the high-risk employee and provides a plan report 30 to the trust plan 18, so that the plan trustee 40 (or investment manager) can procure insurance to protect the plan.

The BPDCM 26 is capable of generating numerous other reports 30 describing any aspect of the plan's design, including the employer/employee data 12, ongoing claims data, insurance information, plan model data, tax information, etc. The plan reports 30 are provided to the employer 10 so that it can determine whether the plan meets its needs, in terms of costs, benefit levels, risk tolerance, etc. At this point the employer 10 can change its input parameters and the entire plan can be remodeled by the BPDCM 26 in order to arrive at a new plan design. This process may be iterated many times until a survivor benefit plan is designed that precisely meets the employers requirements.

Once the survivor benefit plan has been designed, data concerning the plan is downloaded to the Enrollment and Administration Module (or EAM) 28, to implement and manage the plan. The EAM 28 downloads information on the employees to be offered coverage under the plan, benefit levels, contribution amounts, etc., to the Word Processing Module (or WPM) 32, which generates individual enrollment forms 36 that are transmitted to the employees 16. If an employee wants to be covered by the survivor benefit plan, the employee completes the enrollment form 36 by indicating a designated survivor(s), and other information, and sends the completed form 38 back so that the data can be imported into the SBP Database 24 via the DIM 44.

In response to receiving the completed enrollment forms 38, the EAM 28 sends a notification 50 to the payroll department of the employer 14 so that the proper contribution level (from the employer and/or the employee) 48 can be transmitted to the trust plan 18 for investment. The trust plan 18 is the investment vehicle of the survivor benefit system of FIG. 1. This trust could be a Voluntary Employee Beneficiary Association (or "VEBA") trust, as described in § 501(c)(9) of the Federal Tax Code, or could be a Non-Exempt Trust.

The purpose of the trust plan 18 is to provide a means for holding the employer/employee contributions 48 to the survivor benefit plan and to invest these contributions so as to provide enough cash-flow and portfolio yield to meet the expected liabilities as modeled by the BPDCM 26. To do this, the plan trustee 40 purchases investments, such as stocks, bonds, etc., and may also purchase insurance contracts 22 as a general funding strategy or to cover certain high-risk employees as determined by the BPDCM 26 and as provided to the trustee in the plan reports 30. These insurance contracts 22 could be stop-loss, permanent life insurance (fixed or variable), universal life insurance, variable universal life insurance, term-life insurance or a combination of these types of insurance issued on an individual or group basis. The trust pays certain premiums for these insurance contracts 22, and when an employee death occurs, reaps certain proceeds to be used to fund the survivor income benefits payable by the plan. If insurance is purchased on particular high-risk employees, then periodically, such as yearly, data concerning the insurance contracts purchased is provided to the BPDCM 26, and is used as part of the periodic remodeling or redesign of the entire survivor benefit plan in order to facilitate ongoing management and optimization of the insurance contracts 22.

The use of a self-funded trust-based plan provides a major advantage over the prior art insurance-based plans. Any investment gains realized by the investments made by the trust plan 18 inure to the benefit of the plan participants, and not to some third party, like the insurance company. So, if the investment return exceeds the assumed rate, the plan assets and resulting cash-flow are likely to exceed the expected liabilities as modeled by the BPDCM 26. A potential drawback of this investment gain and resulting over-funding of the plan liabilities by the trust is that trust income could become subject to Unrelated Business Income Tax ("UBIT"). Therefore, it is desirable to minimize either the taxable income to the trust plan whenever trust plan assets exceed the liabilities of the survivor benefit plan or the excess funding amount. This can be accomplished in at least three ways: (1) use the trust assets to purchase life insurance contracts on plan participants or to purchase tax exempt securities; (2) lower contribution levels; or (3) raise benefits. The Option (1) purchase of life insurance policies is particularly attractive since it provides the dual benefit of minimizing tax exposure of the trust plan or employer and at the same time minimizing liability exposure of the plan. Therefore, this is the preferred method of dealing with overfunding of the trust plan, options (2) and (3) are alternative methods.

Once the plan has been put in place, the trust setup, the employees enrolled and the investment strategy made and implemented, the EAM 28 is then responsible for administering the ongoing aspects of the plan. When the death of a covered employee occurs, the employer transmits a death notification 52 to the EAM 28, which includes the exact amount of any benefit offset to be applied to the survivor income benefit payable under the plan to the deceased employee's designated survivor(s). The EAM 28 then calculates the net survivor income benefit and downloads this benefit information to the MPM 34, which manages the actual payment of the periodic income benefits to the designated survivor(s) 20 using monies from the trust plan 46.

The EAM 28 also stores actual claims data for each deceased employee in the SBP Database 24. On a periodic basis, such as yearly, the EAM provides detailed claims reports 56 to the trust plan actuary 42. The plan actuary 42 then uses this information 56 to determine the financial status of the survivor benefit plan. Also on a periodic basis—such as annually—the EAM 28 obtains updated employer/employee data 12 on electronic media for importation by the DIM 44 into the SBP Database 24. This updated information can be used to recalculate or remodel the entire survivor benefit plan based on new data concerning the covered employees, such as higher salaries, actual mortality data, etc., or based on new plan parameters as provided by the employer. This new data is also used by the EAM 28 to send enrollment forms 36 to new employees or to employees who have not previously sent in completed enrollment forms 38, as well as to calculate and communicate any employer/employee contributions for the upcoming year.

Figure 2:
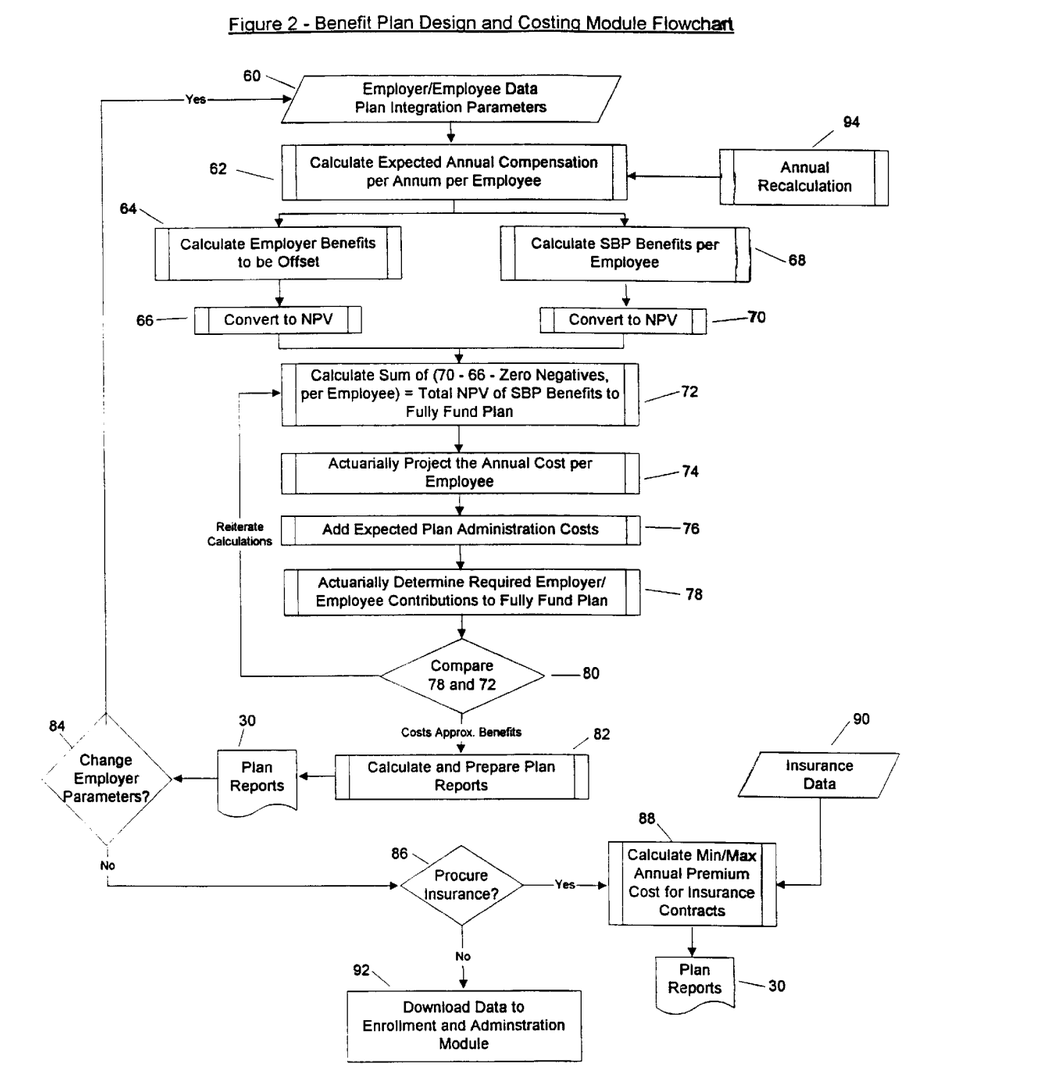
FIG. 2 is a flow chart detailing the functionality of the computer-implemented Benefit Plan Design and Costing Module ("BPDCM") that is part of the SBP system.

FIG. 2 sets forth a flowchart of the steps and functions implemented by the Benefit Plan Design and Costing Module (or BPDCM) 26. Beginning at step 60, the employer/employee data and plan integration parameters 12 are retrieved from the SBP Database 24. At step 62, the expected annual compensation over a period of years is calculated for each employee, using the employer/employee data from step 60. Then, the BPDCM 26 calculates the employer benefits from other sources to be offset and integrated into the survivor income benefit at step 64. This offset value is converted to a present value at step 66. At the same time, the BPDCM 26 calculates the survivor income benefit (or SBP benefit) for each employee 68 and converts this value to a present value 70.

Although not shown in the flowchart of FIG. 2, step 68 may include several substeps. For example, this step may include the following substeps: (1) identifying each employee in the database 24 to whose survivor(s) a survivor income benefit is to be paid; (2) identifying information necessary to determine a "range" of survivor income benefits that the system may select to be paid to a particular employee's beneficiary (this "range" is typically from 10 to 100% of the employee's annual cash compensation); (3) determining a "range" of survivor income benefits for each employee; (4) determining the expected mortality of each employee (this could be based on a general purpose mortality table stored in the SBP Database, or, over time, based upon an employer-specific mortality table); (5) determining the life expectancy of the designated survivor(s); (6) based on (4) and (5), calculating a benefit payment period for the lifetime of the employee's spouse, or for some specified number of years (such as 20) for other designated survivor (s); and (6) selecting the survivor income benefit level from the "range" calculated.

At step 72, the BPDCM 26 sums the difference between the calculated PV survivor income benefit per employee 70 and the benefit offsets 66 to arrive at a total net present value of SBP benefit. (If the offsets are greater than the survivor income benefit for a particular employee for a particular period computed in 70, the SPB benefit becomes zero for that period.) Certain actuarial assumptions are then made concerning expected mortality, interest rates, etc., and at step 74, the projected annual cost to fund the expected liability per employee is calculated for the plan. To this value, the expected plan administration costs are added at step 76. The amount computed at step 76 represents the total estimated plan costs for a particular period, such as a year. Once the total costs have been determined, the system must then determine the employer and/or employee contribution levels needed to meet the predetermined funding level desired by the employer. This predetermined funding level is preferably 100%, but could be less than or greater than 100% depending on the needs of the employer.

At step 78 the system computes an estimation of the required employer and/or employee contributions necessary to meet the predetermined funding level of the expected plan liabilities or costs from steps 74 and 76. At step 80, the estimated contribution levels are compared to the expected liabilities from step 76 to determine if the computed contributions will suffice to meet the predetermined funding level. If the contributions are greater than or equal to the predetermined funding level multiplied by the costs of benefits expected to be provided from the plan, then the BPDCM proceeds to step 82. IC however, the contribution levels computed in step 78 are less than the predetermined funding level multiplied by the expected liabilities of the plan, the calculation is reiterated back to step 78, and the steps 78–80 are performed again, until the decision step 80 determines that the contribution levels last computed at step 78 are sufficient to meet the predetermined funding level.

Once a plan has been designed, the BPDCM 26 calculates and prepares plan reports 30 at step 82. These plan reports are transmitted to the employer 10 and perhaps the employees 16, and illustrate the annual SBP contribution levels and survivor income benefit for each employee and the expected composite costs for the employer and the plan. The reports 30 may also include the names, ages, gender and the net present value amounts for each employee whose survivor income benefit PV exceeds the employer's risk tolerance.

At step 84, the employer has the opportunity to review and change the plans parameters. If the employer decides that the plan, as modeled, is too costly, doesn't provide enough benefits, or for any other reason doesn't like the current structure of the plan, then the SBP system loops back to step 60, where the process of modeling the plan is reiterated, with any new employer parameters being downloaded from the SBP Database 24.

If the plan, as modeled, meets the employer's expectations, then the BPDCM 26 proceeds to step 86, where the decision is made whether or not to procure insurance products for the high-risk employees identified in the plan reports 30 and/or any other employees. If the employer desires to procure insurance to cover the high-risk employees and/or any other employees, then at step 88, the minimum and maximum annual premium costs for the insurance contracts for such employees is computed using insurance data 90, which is periodically provided to the BPDCM. A plan report 30 is then generated to be sent to the plan trustee 40 so that the insurance coverage can be obtained. Once the insurance has been purchased, the BPDCM 26 proceeds to step 92, where transfer of the system is passed to the EAM 28, which manages the ongoing administrative tasks of the plan.

Also shown in FIG. 2 is the annual recalculation step 94. The SBP System is constructed so that on a periodic basis, such as annually, the EAM 28 obtains updated employer/employee data 12, imports this data via the DIM 44 into the SBP Database 24, and instructs the BPDCM 26 to remodel or recalculate the survivor benefit plan. The BPDCM 26 then progresses through all of the above described steps to arrive at the current year costs and contribution amounts for the plan. This information is put into the plan reports 30, which are provided to the employer and subsequently to the employees. Based on this updated information, the employer can then decide whether to change certain employer parameters and thus redesign the plan prior to distributing the employees reports. This step reveals the ultimate flexibility of the present invention. No known prior art method of providing a survivor benefit plan includes these computer-implemented steps of periodically redesigning and remodeling the plan so that it optimally meets the employer's and employee's expectations over time.

Figure 3:
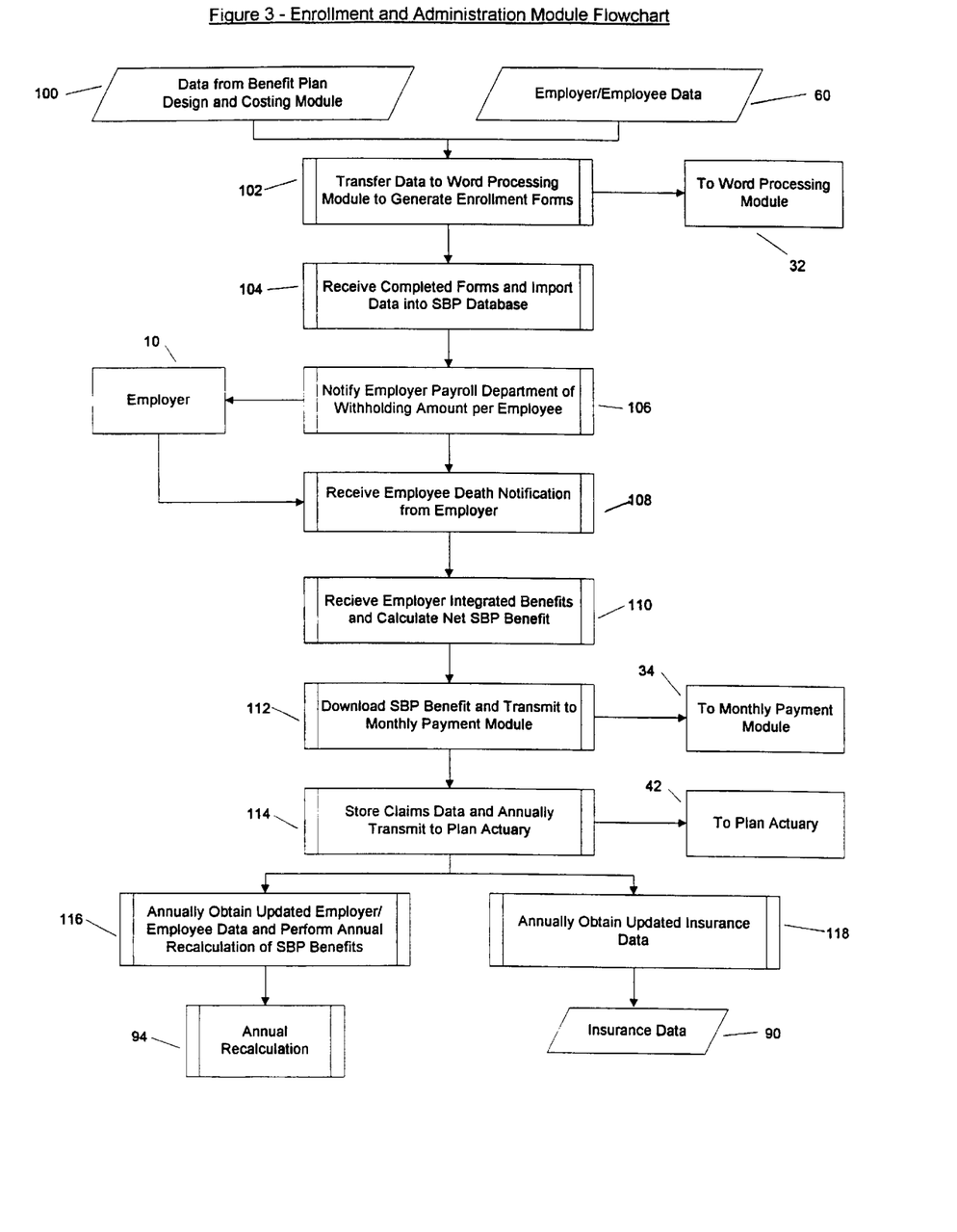
FIG. 3 is a flow chart detailing the functionality of the computer-implemented Enrollment and Administration Module ("EAM") that is part of the SBP system.

Turning now to FIG. 3, a flowchart of the Enrollment and Administration Module (or EAM) 28 is set forth. The EAM 28 is used by the computer-implemented SBP system to administer the ongoing operation of the survivor benefit plan designed in the BPDCM 26. As an initial step, the EAM 28 downloads data from the SBP Database 24 at step 60 and also from the BPDCM 26 at step 100 and transfers this data to the WPM 32 at step 102 in order to generate the enrollment forms 36. These enrollment forms are transmitted from the WPM 32 to the employees 16, who complete the forms 38 and transmit them back to the SBP system, where the data from the completed forms 38 is imported into the SBP Database 24 using the DIM 44. The EAM 28 then sends a notification 50 to the payroll department 14 of the employer 10 so that the correct employer/employee contributions 48 can be transferred to the trust plan 18 for investment.

At step 108, the EAM 28 receives notification 52 from the employer 10 that a covered employee has died, and also informs the EAM 28 as to the exact amount of any other employer selected benefit that is to be integrated into the survivor income benefit provided under the plan. The EAM receives this information at step 110 and calculates the net SBP benefit to be paid to the employee's designated survivor (s). The SBP benefit amount, payment period, and survivor (s) information is then provided to the Monthly Payment Module (or MPM) 34 at step 112, so that the MPM 34 can manage the payment of the survivor income benefit to the designated survivor(s) 20.

For each claim made under the survivor benefit plan, the EAM 28 records information and stores this claim data into the SBP Database 24 at step 114. On a periodic basis, such as annually, the EAM provides this claims data to the trust plan actuary 42. The plan actuary 42 uses this claims information, along with the other plan reports 30, and the performance of the investments held in the trust 18 to determine the financial status and health of the plan. The actuary's analysis can then be used in the periodic recalculation or remodeling process to alter the parameters of the plan.

The EAM includes two additional periodic functions. In step 116, the EAM obtains updated employer/employee data 12 and instructs the BPDCM 26 to perform the periodic (such as annual) remodeling 94 of the survivor benefit plan to account for changes in employer parameters, actual plan assets and liabilities, employee data, etc. This recalculation step 94 provides a level of optimization and flexibility unknown in the prior art.

A second periodic function enabled by the EAM 28 is set forth in step 118, where the EAM 28 periodically obtains updated insurance data concerning the insurance contracts (if any) purchased by the trust plan 18 in order to minimize liability and income tax exposure for the plan. This step provides a level of ongoing management and optimization of the insurance contracts also unknown in the prior art systems.

Having described in detail the preferred embodiment of the present invention, including its preferred modes of operation and functions, it is to be understood that this operation could be carried out with different elements and steps. This preferred embodiment is presented only by way of example and is not meant to limit the scope of the present invention which is defined by the following claims.

What is claimed:

1. A computer-implemented data-processing method for providing survivor income benefits to an employee's-designated survivor(s), comprising the steps of:

providing a computer system for executing the computer-implemented method, the computer system having a database for storing information;

storing employee and survivor(s) information in the database necessary to calculate a survivor income benefit and a benefit payment period for each employee-designated survivor(s) and calculating the survivor income benefit using this information;

calculating the net present value of the survivor income benefit for each survivor(s);

identifying all survivor benefits payable to each employee's-designated survivor(s), from other enumerated sources, and entering this information into the database;

calculating the net present value of the survivor benefits payable from other sources for each employee-identified survivor(s);

calculating, by processing information in the database on the computer system, projected year-by-year differences between the present value of the survivor income benefit payable to each survivor(s) and the present value of the survivor benefits payable from other sources to each survivor(s), and storing this information into the database on the computer system;

determining, by processing information in the database on the computer system, the year-by-year net present value of investment assets whose portfolio value or investing-resulting cash flow provides cash equaling the projected difference between each survivor(s) income benefit and each survivor(s) benefits payable from other sources;

providing data from the computer system so that sufficient investment assets may be acquired or sold to provide necessary year-by-year investment-resulting cash flow and portfolio yield, from contributions made by at least one of the employer and the employee;

making periodic payments to each survivor(s), each payment being proportionate to the survivor income benefit divided by the benefit payment period;

redetermining annually the survivor income benefit, the survivor benefits from other sources, the benefit payment period, the value of investment assets, and the contributions made by at least one of the employer and employee, and storing this information into the database; and continuing the periodic payments to each survivor(s) for a set period of time or until a benefit termination event occurs.

2. The method of claim 1, wherein the step of storing and calculating comprises the steps of:

identifying each employee to whose survivor(s) a survivor income benefit is to be provided and storing this information in the database on the computer system;

identifying for each employee information necessary to determine a range of survivor income benefit which may be selected to be paid to the employee's survivor(s), including but not limited to the employee's annual cash compensation, employee's gender, birth date, years of service with the employer, and, if the employee is married, the employee's spouse's gender and birth date, and storing this information into the database on the computer system;

determining for each employee the range of survivor income benefits available to be paid to the employee's survivor(s);

determining the expected mortality of each employee;

determining the life expectancy of the spouse of each employee, if the employee is married;

determining the benefit payment period for each designated survivor(s); and selecting the survivor income benefit, from the range of survivor income benefits available to be paid to each survivor(s), to be paid during each designated survivor(s) benefit payment period and storing the information into the database on the computer system.

3. The method of claim 2, wherein the redetermining step comprises the steps of:

redetermining annually the expected mortality of each employee;

redetermining annually the life expectancy of each employee's spouse;

redetermining the benefit payment period for each survivor(s), and storing this information into the database on the computer system;

determining, by processing information in the database on the computer system, any change in the year-by-year net present value of investment assets or change in the assets' investment-resulting cash flow, on the annual basis, for each employee, whereby a re-determination of sufficient investment assets is enabled and storing this information into the database on the computer system;

determining, by processing information in the database on the computer system, any change in availability or amount of survivor's benefits from the other sources, on an annual basis, for each employee, whereby a re-determination of the difference between the other source survivor benefits and the survivor income benefit is enabled and storing the information into the database on the computer system; and adjusting the contributions from the employer or employee in view of any change in net present asset value, investment-generated cash flow or survivor's benefits from other sources, to maintain the survivor income benefit for each survivor(s) for the redetermined benefit payment period by the computer system sending a control signal to the employer's payroll department so that the contribution can be adjusted.

4. The method of claim 2, wherein the employee-designated survivor(s) are selected from the group consisting of the employee's spouse, one or more individuals, or the spouse and or one or more individuals.

5. The method of claim 2, wherein the range of total survivor income benefits available to the employee's survivor(s), is from 10 to 100% of the employee's annual cash compensation, payable in twelve (12) periodic/monthly payments.

6. The method of claim 2, wherein the minimum benefit payment period for the survivor income benefit, when the employee has no spouse or the employee's spouse predeceases the employee, is the number of years from the employee's death selected by the employer.

7. The method of claim 2, wherein the minimum benefit payment period for the survivor income benefit, when the employee's spouse is the sole selected designated survivor, is the number of years from the employee's death selected by the employer.

8. The method of claim 1 further comprising the step of establishing a trust to hold title to the investment assets acquired to provide the necessary investment-resulting cash flow and portfolio yield.

9. The method of claim 1 wherein at least one of the investment assets comprises an insurance policy naming the employee(s) as the insured.

10. The method of claim 9 wherein the insurance policy is selected from the group consisting of permanent fixed or variable life insurance, universal life insurance, variable universal life, term life insurance, stop-loss insurance, or a combination of such types of insurance issued on an individual or group basis.

11. The method of claim 8, wherein the trust is a non-exempt trust.

12. The method of claim 8, wherein the trust is a VEBA trust.

13. The method of claim 1, further comprising the steps of:
constructing a mortality database for the employer, using mortality experience data specific to the employer, when the employer's historical mortality experience is of sufficient duration and employee population size to provide credible results by current accounting standards, whereby a determination of each the employee's expected mortality may be determined; and
determining the expected mortality of each employee, by processing information using the mortality database.

14. The method of claim 8, further comprising the steps of:
identifying particular employees whose survivor income benefit exceeds a risk limit established by the employer;
purchasing a life insurance policy for each such employee; and
using the insurance proceeds of the life insurance policy as an investment asset or as cash flow to provide survivor income benefit payments.

15. A computer system for designing and administering self-funded survivor benefit plans, the system comprising:
database for storing employer and employee information needed to design the plan;
a data import module (DIM) for receiving the employer and employee information and for importing the information into the database;
a benefit plan design and costing module (BPDCM) for designing a model of the survivor benefit plan using the employer and employee information stored in the database, the model including calculations of survivor income benefit levels and payout periods for each employee's designated survivor(s), the expected annual liabilities of the plan and the required contribution levels on the part of the employer and/or employees necessary to fund the plan to a predetermined finding level;
an enrollment and administration module (EAM) for implementing the plan and administering the contribution levels and periodic payout of survivor income benefits to and from the plan; and
an investment vehicle for holding the contributions made by the employer and/or employees.

16. The computer system of claim 15, further comprising:
a word processing module (WPM) for receiving enrollment information from the EAM and for generating enrollment forms to be sent to the employees who may be covered under the plan.

17. The computer system of claim 16, wherein the employees who desire coverage under the plan complete the enrollment forms which are then imported into the system using the DIM.

18. The computer system of claim 15, further comprising:
monthly payment module (MPM) for receiving survivor income benefit information from the EAM and for periodically providing payments under the plan to the employee's designated survivor(s).

19. The computer system of claim 18, wherein the survivor income benefit information includes a survivor income benefit payment, a benefit payment period, and the name and address of the designated survivor.

20. The computer system of claim 15, wherein the DIM converts the employer and employee information into an ASCII record for storage in the database.

21. The computer system of claim 15, wherein the BPDCM comprises:
means for calculating the expected annual compensation per annum of each employee;
means for calculating the net present value (NPV) of the survivor income benefit for each employee;
summing means for calculating the total survivor income benefits for the plan;
means for projecting the annual plan cost for each employee;
summing means for calculating the expected annual total plan cost, including expected administrative costs; and
means for determining a required employer and/or employee contribution level to fully fund the expected annual total plan cost to the predetermined level.

22. The computer system of claim 21, wherein the BPDCM further comprises:
means for calculating the PV of benefits provided by the employer other than the survivor income benefit on the death of the employee; and
means for subtracting the PV of the other employer benefits from the PV of the survivor income benefit for each employee prior to summing the total survivor income benefits for the plan.

23. The computer system of claim 21, wherein the BPDCM further comprises:
means for recalculating the expected annual total plan cost and the required employer and/or employee contribution level.

24. The computer system of claim 21, wherein the BPDCM further comprises:
means for generating plan reports that detail the expected annual total plan cost and the required employer and/or employee contribution level.

25. The computer system of claim 24, wherein the plan reports are provided to the employer, and the employer can then change certain employer data or parameters regarding the plan, which is stored in the database.

26. The computer system of claim 25, wherein the BPDCM further comprises:

means for redesigning the survivor benefit plan using the changed employer data or parameters stored in the database.

27. The computer system of claim 15, wherein the BPDCM further comprises:

means for determining whether certain employees are high-risk individuals, indicating that the survivor benefit for the certain employees exceeds an employer designated risk threshold;

means for calculating the minimum and maximum annual premium cost for insurance contracts to cover the high-risk and other employees; and means for generating plan reports that indicate the high-risk and other individuals and the costs of their insurance.

28. The computer system of claim 15, wherein the investment vehicle is a trust fund having a trustee that manages the assets of the trust.

29. The computer system of claim 28, wherein the trust fund is a VEBA trust.

30. The computer system of claim 28, wherein the trust fund is a non-exempt trust.

31. The computer system of claim 27, wherein the investment vehicle is a trust fund having a trustee that manages the assets of the trust.

32. The computer system of claim 31, wherein the plan reports that indicate the high-risk individuals and the costs of insurance are provided to the plan trustee who purchases insurance contracts covering the high-risk employees.

33. The computer system of claim 32, wherein the insurance contracts are selected from the group consisting of permanent fixed or variable life insurance, universal life insurance, variable universal life, term life insurance, stop-loss insurance, or a combination of such types of insurance issued on an individual or group basis.

34. The computer system of claim 21, wherein the means for calculating the net present value (NPV) of the survivor income benefit for each employee comprises:

means for identifying each employee to whose survivor(s) a survivor income benefit is to be provided and for storing this information in the database on the computer system;

means for identifying for each employee information necessary to determine a range of survivor income benefit which may be selected to be paid to the employee's survivor(s), including but not limited to the employee's annual cash compensation, employee's gender, birth date, years of service with the employer, and, if the employee is married, the employee's spouse's gender and birth date, and storing this information into the database on the computer system;

means for determining for each employee the range of survivor income benefits available to be paid to the employee's survivor(s);

means for determining the expected mortality of each employee;

means for determining the life expectancy of the spouse of each employee, if the employee is married;

means for determining each designated survivor'(s) benefit payment period, and for storing this information into the database on the computer system; and means for selecting the survivor income benefit, from the range of survivor income benefit available to be paid to each survivor(s), to be paid during each designated survivor'(s) benefit payment period and for storing the information into the database on the computer system.

35. The computer system of claim 15, wherein the EAM comprises:

means for periodically obtaining updated employer and employee information and for directing the DIM to import the updated information into the database; and means for recalculating the survivor benefit plan based on the updated information obtained from the employer and employees.

36. The computer system of claim 16, wherein the EAM comprises:

means for downloading information from the database and from the BPDCM and for transferring this downloaded information to the WPM so that it can generate the enrollment forms.

37. The computer system of claim 15, wherein the EAM comprises:

means for notifying the employer of the contribution levels required for each employee as determined by the BPDCM.

38. The computer system of claim 37, wherein the employer's payroll department includes means for receiving the contribution notification and means for transmitting contribution funds to the investment vehicle for each employee.

39. The computer system of claim 15, wherein the EAM comprises:

means for receiving a death notification from the employer indicating that a particular employee covered by the plan has died, the death notification including the amount of any other employer benefits to be integrated with the survivor income benefit provided by the plan.

40. The computer system of claim 39, wherein the EAM further comprises:

means for downloading survivor income benefit information to the MPM so that the MPM can provide the periodic payments to the designated survivor(s).

41. The computer system of claim 40, wherein the EAM further comprises:

means for collecting and storing claims data for each deceased employee in the database.

42. The computer system of claim 41, wherein the claims data is used to construct a mortality database specific to the employer, which is stored in the database, and which may be used by the BPDCM to recalculate the survivor benefit plan.

43. The computer system of claim 41, wherein the claims data is periodically transmitted to a plan actuary associated with the investment vehicle in order to assess the financial status of the survivor benefit plan.

44. A computer-implemented method of designing and administering a self-funded survivor benefit plan comprising the steps of:

importing employer and employee data into a database;

designing a survivor benefit plan using the data in the database, the designed plan including calculations of survivor income benefit levels for each employee's designated survivor(s), the expected annual liabilities of the plan, and the required contribution levels to fund the plan to a predetermined funding level;

implementing the plan by sending enrollment letters to the employees and receiving completed enrollment forms for those employees who desire coverage under the plan;

notifying the employer of the contribution levels for those covered employees;

transferring the contributions to a trust fund;

receiving a death notification from the employer when a covered employee has died; and providing a periodic payment stream to the employee's designated survivor(s) based on the calculated survivor income benefit level.

* * * * *